United States Patent [19]

Hopkins

[11] Patent Number: 4,971,205

[45] Date of Patent: Nov. 20, 1990

[54] CABINET STRUCTURE FOR STORING MULTIPLE STANDS

[76] Inventor: John D. Hopkins, 1013 Climax, Lansing, Mich. 48912

[21] Appl. No.: 326,559

[22] Filed: Mar. 21, 1989

[51] Int. Cl.$^5$ .............................................. A47F 7/00
[52] U.S. Cl. ..................................................... 211/13
[58] Field of Search ................ 211/13, 59.2, 162, 26, 211/134, 135

[56] References Cited

U.S. PATENT DOCUMENTS

| | | | |
|---|---|---|---|
| 2,622,541 | 12/1952 | Smart | 211/162 X |
| 2,852,327 | 9/1958 | Mason | 211/59.2 X |
| 3,907,116 | 9/1975 | Wolf et al. | 211/134 X |
| 4,356,923 | 11/1982 | Young et al. | 211/59.2 |
| 4,474,297 | 10/1984 | Zucker | 211/59.2 |
| 4,744,489 | 5/1988 | Binder et al. | 211/59.2 X |

Primary Examiner—Robert W. Gibson, Jr.
Attorney, Agent, or Firm—Ian C. McLeod

[57] ABSTRACT

A cabinet structure (10) for stands (100) stored on trays (17a, 17b and 18a and 18b) at multiple horizontal planes (a—a, b—b) in the cabinet structure so that the bases of the stands are preferably in a staggered relationship between trays between the planes is described. The cabinet structure is particularly adapted for use in storing intravenous stands which are used in hospitals and for recharging pumping equipment (104) on poles (101) while they are stored.

11 Claims, 1 Drawing Sheet

CABINET STRUCTURE FOR STORING MULTIPLE STANDS

BACKGROUND OF THE INVENTION (1) Field of the Invention

The present invention relates to a cabinet structure for storing multiple stands with poles in a vertically staggered relationship. In particular the present invention relates to a cabinet structure for storing the stands having an elongate pole projecting outside of the structure vertically from a base with the bases inside the cabinet structure.

(2) Prior Art

Stands with elongate poles projecting from a base and with legs perpendicular to the longitudinal axis of the poles are used for a variety of purposes such as music stands, retail clothes displays and the like. One important use of such stands is in hospitals where they support electric intravenous pumping equipment, blood pressure monitors, lights and the like. When the stands are not in use, storage is a problem. The reason is that the legs and height of the poles make them ungainly. In order to store the stands when they are not in use, a large amount of floor space is necessary. In a hospital setting, floor space is particularly at a premium and is expensive. Further, there is a need to recharge the batteries of intravenous pumping equipment mounted on the IV pole stands and conventionally a few which are near an electrical outlet are charged at one time, which presents a significant maintenance expense and logistics problem.

OBJECTS

It is therefore an object of the present invention to provide a storage cabinet for multiple of the stands. Further, it is an object of the present invention to provide a cabinet structure which is useful for storing IV pole stands. Further still, it is an object of the present invention to provide a cabinet structure which allows multiple IV pumps to be easily recharged simultaneously. Further still, it is an object of the present invention to provide a cabinet structure which is simple and economical to construct. These and other objects will become increasingly apparent by reference to the following description and the drawings.

IN THE DRAWINGS

GENERAL DESCRIPTION

Figure 1:
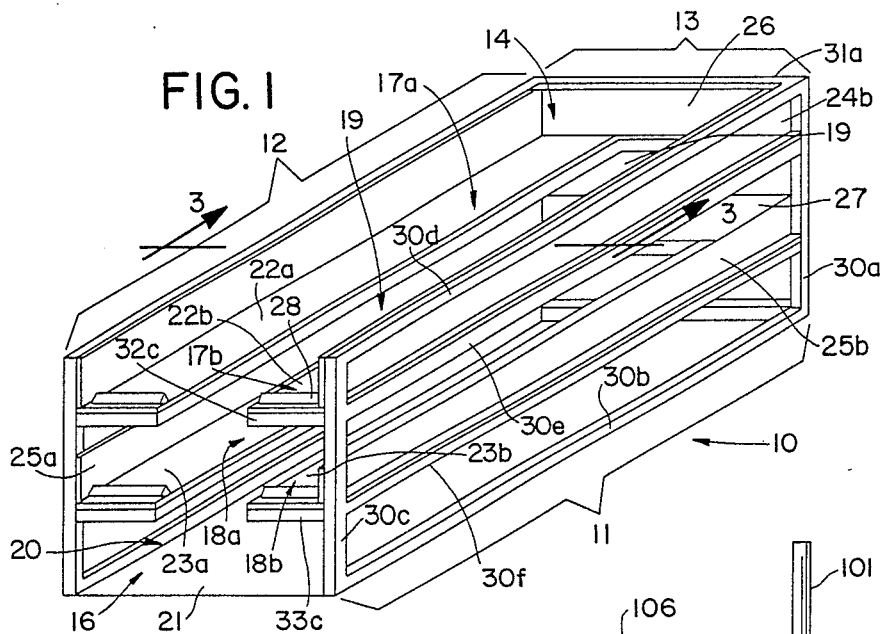
FIG. 1 is a front perspective view of the preferred cabinet structure of the present invention showing trays for supporting the bases of the stands with poles extending from the bases vertically outside of the cabinet structure.

The present invention relates to a cabinet structure for storing a plurality of stands each having an elongate, vertically oriented pole having a longitudinal axis and a base supporting the pole with a plurality of legs extending perpendicular to the longitudinal axis of the pole which comprises: a pair of spaced apart vertically oriented parallel side wall means having opposed ends defining an enclosure and a vertically oriented end wall means provided on each of the side wall means at one of the ends so as to hold the vertically oriented wall means in position; and at least two sets of horizontally oriented tray means provided on each of the side wall means inside the enclosure so that the tray means in each set are spaced parallel to each other and each set is in separate horizontal planes to provide slots between each set of the tray means wherein the other of the ends of the cabinet is open adjacent the slots so that in use of the cabinet structure the stands are slid on the bases horizontally on the tray means with each of the bases on one off the sets of spaced apart tray means in one of the horizontal planes and with each of the poles extending vertically outside of the cabinet structure with the longitudinal axes in a line along the slots.

The present invention also relates to a method for storing a plurality of stands with an elongate vertically mounted pole having a longitudinal axis and supporting base with a plurality of legs extending perpendicular to the longitudinal axis of the pole which comprises: a pair of spaced apart vertically oriented parallel side wall means having opposed ends defining an enclosure and a vertically oriented end wall means provided on each of the side wall means at one of the ends so as to hold the vertically oriented wall means in position; and at least two sets of horizontally oriented tray means provided on each of the side wall means inside the enclosure so that the tray means in each set are spaced parallel to each other and each set is in separate horizontal planes to provide slots between each set of the tray means wherein the other of the ends of the cabinet is open adjacent the slots so that in use of the cabinet structure the stands are slid on the bases horizontally on the tray means with each of the bases on one off the sets of spaced apart tray means in one of the horizontal planes and with each of the poles extending vertically outside of the cabinet structure with the longitudinal axes in a line along the slots; and pushing a plurality of poles into the stand such that the bases of the stands are alternately at different horizontal planes on the tray means in line with the slots.

The cabinet structure can be fabricated of metal or plastic and can be assembled using various fasteners or welding. Heat welding or adhesives can be used for the metal and solvent welding or adhesives can be used for the plastic. In any event, it is important that the resulting cabinet structure be able to hold the stands.

Preferably tubular elements are used to fabricate framing for the structure in order to reduce the weight of the structure. The trays can include sheet material in those portions of the cabinet structure which can come into contact with the bases of the stands.

SPECIFIC DESCRIPTION

FIGS. 1 to 4 show the preferred cabinet structure 10 of the present invention for supporting stands 100. Side walls 11 and 12 are vertically oriented and are supported by end wall 13 to provide an enclosure 14 with an open top 15 (FIG. 3) and an open end 16 opposite the end wall 13. Inside the enclosure 14 are mounted trays 17a, 17b and 18a and 18a such that the trays 17a and 17b are in a single horizontal plane a—a and the trays 18a and 18a are in a single horizontal plane b—b spaced from plane a—a and such that the trays 17a, 17b, 18a and 18a define slots 19 and 20 one above the other which lead to the open end 16 of the structure 10. The side walls 11 and 12 and end wall 13 are preferably covered by a base 21 of sheet material which also aids in holding the structure 10 together.

The walls 11 and 12 are identical as are the trays 17a, 17b, 18a and 18a. Square cross-sectioned tubes 30a to 30e provide a rectangular frame of side wall 11. mounted between vertically oriented tubes 30a and 30c. End wall 13 is defined by horizontal tubes 31a, 31b, 31c and 31d which are connected to tubes 30a of side walls 11 and 12 Horizontally oriented tubes 32a and 33a (FIG. 3) are connected to horizontally oriented tubes 32b and 32c and 33b and 33c in horizontal planes a—a and b—b which with tubes 30e and 30f, respectively, to provide a horizontal support for trays 17a, 17b, 18a and 18a. Sheets 22a and 22b are mounted on tubes 30e, 32a, 32b and 32c to provide the tray 17a or 17b. Horizontally oriented sheets 23a and 23b are mounted on tubes 30f, 33a, 33b and 33c to provide trays 17a or 17b. Vertically oriented sheets 24a, 24b and 25a and 25b are mounted on the walls 11 and 12 adjacent the trays 17a, 17b and 18a and 18a to provide support for the cabinet structure 10 and also to prevent the stands 100 from slipping out of the cabinet structure 10. Sheets 26 and 27 are mounted on end wall 13 above the trays 17a, 17b, 18a and 18a for support for the cabinet structure 10 and to prevent the stands 100 from slipping out of the cabinet structure 10.

Figure 2:
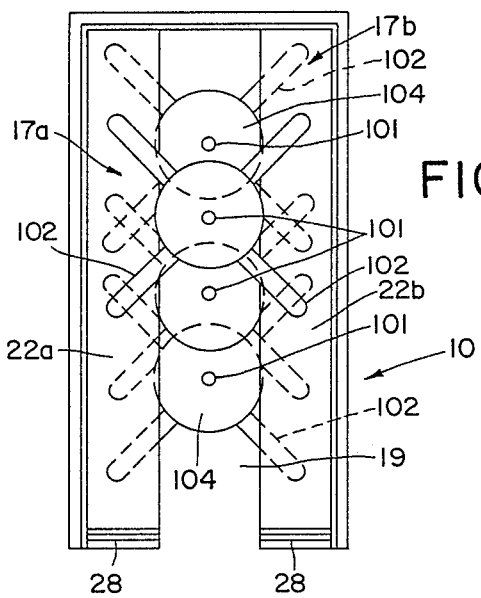
FIG. 2 is a plan view of the cabinet structure of FIG. 1 showing intravenous stands in the cabinet structure with the poles projecting from the plane of the paper in a staggered relationship.
Figure 3:
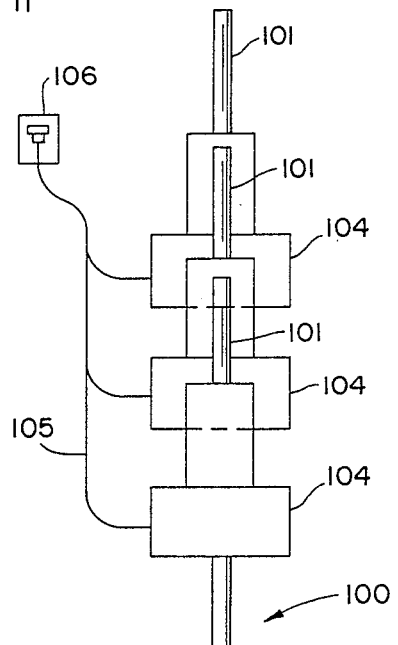
FIG. 3 is a cross-sectional view along line 3—3 of FIG. 1.
Figure 3:
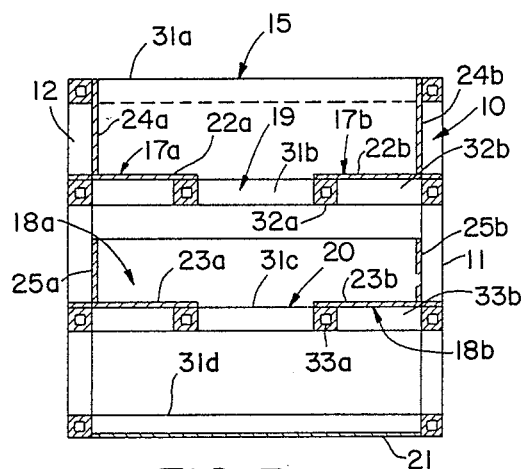
Figure 4:
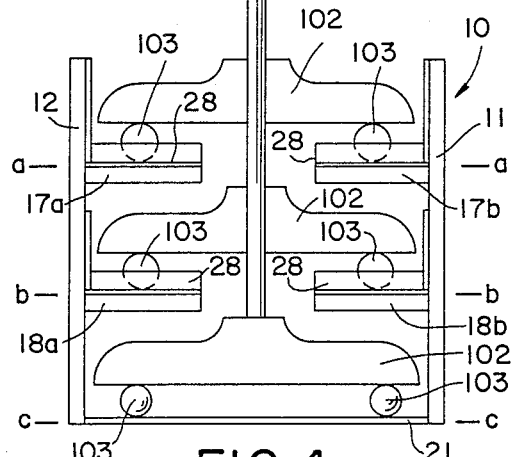
FIG. 4 is an end view of the cabinet structure shown in FIG. 1 showing the intravenous pole stands stored in the cabinet structure on trays at various levels with the poles in a vertically staggered relationship.

As can be seen from FIGS. 2 and 4, the stands 100 include a pole 101 and a base 102, preferably with rollers 103. Generally when used as an intravenous stand (IV) the poles 101 support pumping equipment 104. The stands 100 are positioned in the cabinet 10 so that the bases are on different horizontal planes a—a, b—b and c—c with the poles 101 in a vertically staggered relationship. This allows many stands 100 to be positioned in the relatively small enclosure 14 of the cabinet 10.

Stops 28 are provided at the open end 16 of the cabinet 10 on each of sheets 22a, 22b, 23a and 23b so that the stands 100 will not roll out of the cabinet 10 on rollers 103 if the floor supporting the cabinet 10 (not shown) is not level.

With IV pole stands 100, the pumping equipment 104 is periodically recharged by electrical cord 105 from a power supply 106. In this manner, pumping equipment 104 on multiple stands 100 can be simultaneously recharged.

In use the stands 100 are slid or pushed through the open end 16 of the cabinet 10 onto the trays 17a and 17b or 18a and 18a, and optionally on base 21, generally in an alternating manner in order to maximize the number of stands 100 which can be fitted into the enclosure 14 of the cabinet 10. The result, particularly in hospitals, is a very desirable space saving.

It is intended that the foregoing description be only illustrative of the present invention and that the present invention be limited only by the hereinafter appended claims.

I claim:

1. A cabinet structure for storing a plurality of stands each having an elongate, vertically oriented pole having a longitudinal axis and a base supporting the pole with a plurality of legs extending perpendicular to the longitudinal axis of the pole which comprises:

(a) a pair of spaced apart vertically oriented parallel side wall means having opposed ends defining an enclosure and a vertically oriented end wall means provided on each of the side wall means at one of the ends so as to hold the vertically oriented wall means in position; and (b) at least two sets of horizontally oriented tray means provided on each of the side wall means inside the enclosure so that the tray means on each set are spaced parallel to each other and each set is in separate horizontal planes to provide slots between each set of the tray means, wherein the other of the ends of the cabinet is open adjacent the slots so that in use of the cabinet structure the stands are slid on the bases horizontally on the tray means with each of the bases on one of the sets of spaced apart tray means in one of the horizontal planes and with each of the poles extending vertically outside of the cabinet structure and wherein the tray means has a depth and spacing between the horizontal planes of the tray means so as to receive the poles in a vertically staggered relationship with the bases on the horizontal planes of each of the sets of the tray means.

2. The cabinet structure of claim 1 wherein the side wall means and end wall means are constructed of tubular rods such that the rods provide vertically oriented frames defining the side wall means and end wall means, wherein each of the tray means is defined by a second horizontally oriented frame provided on the side wall means so as to define the slots and wherein sheet means are mounted horizontally on each of the horizontally oriented frames of the tray means to provide the support for the bases of the stands.

3. The cabinet structure of claim 2 wherein second sheet means are mounted on the side wall means above each horizontal plane of the tray means so as to be positioned adjacent to the bases of the stands to prevent the bases from being displaced from the tray means.

4. The cabinet structure of claim 1 wherein stop means are provided on the tray means at the other of the ends of the cabinet structure which is open to prevent the bases of the stands from moving out of the cabinet structure.

5. The cabinet structure of claim 2 wherein stop means are provided on the sheet means for the tray means at the other of the ends of the cabinet structure which is open so as to prevent the stands from moving out of the cabinet structure.

6. The cabinet structure of claim 1 wherein the tray means are vertically spaced from each other in the horizontal planes so as to accommodate a stand with rollers on the base.

7. The cabinet structure of claim 6 wherein the stands are intravenous poles used in hospitals.

8. A method for storing a plurality of stands with an elongate vertically mounted pole having a longitudinal axis and supporting base with a plurality of legs extending perpendicular to the longitudinal axis of the pole which comprises:

(a) providing in a setting where the stands are to be stored a cabinet structure with a pair of spaced apart vertically oriented parallel side wall means having opposed ends defining an enclosure and a vertically oriented end wall means provided on each of the side wall means at one of the ends so as to hold the vertically oriented wall means in position; and at least two sets of horizontally oriented tray means provided on each of the side wall means inside the enclosure so that the tray means on each set are spaced parallel to each other and each set is in separate horizontal planes to provide slots between each set of the tray means, wherein the other of the ends of the cabinet is open adjacent the slots so that in use of the cabinet is open adjacent the slots so that in use of the cabinet structure the stands are slid on the bases horizontally on the tray means with each of the bases on one of the sets of spaced apart tray means in one of the horizontal planes and with each of the poles extending vertically outside of the cabinet structure and wherein the tray means has a depth and spacing between the horizontal planes of the tray means so as to receive the poles in a vertically staggered relationship with the bases on the horizontal planes of each of the sets of the tray means; and (b) pushing a plurality of poles into the stand such that the bases of the stands are alternately at different horizontal planes on the tray means in line with the slots.

9. The method of claim 8 wherein the cabinet structure has tray means which are vertically spaced from each other so as to accommodate a stand with rollers on the base and the stands are rolled on the rollers onto the trays by pushing the stands.

10. The method of claim 9 wherein the stands are intravenous pole stands with rechargeable electrical pumping means which are oriented to allow simultaneous recharging.

11. The method of claim 10 wherein in addition the fluid pumping equipment on the stands are simultaneously recharged while the stand is in the cabinet structure.

* * * * *

UNITED STATES PATENT AND TRADEMARK OFFICE
CERTIFICATE OF CORRECTION

PATENT NO. : 4,971,205

DATED : November 20, 1990

INVENTOR(S) : John D. Hopkins

It is certified that error appears in the above-identified patent and that said Letters Patent is hereby corrected as shown below:

Column 2, line 17, "off" should be --of--.

Column 2, line 40, "off" should be --of--.

Column 2, line 67, "18a", second occurrence, should be --18b--.

Column 3, line 1, "18a" should be --18b--.

Column 3, line 3, "18a" should be --18b--.

Column 3, line 11, before "mounted", insert --Square cross-sectioned tubes 30e and 30f are horizontally--.

Column 3, line 9, "18a" should be --18b--.

UNITED STATES PATENT AND TRADEMARK OFFICE
CERTIFICATE OF CORRECTION

PATENT NO.   : 4,971,205

DATED        : November 20, 1990

INVENTOR(S)  : John D. Hopkins

It is certified that error appears in the above-identified patent and that said Letters Patent is hereby corrected as shown below:

Column 3, line 14, a period --.-- should be inserted after "12".

Column 3, line 19, "18a", should be --18b--.

Column 3, line 25, "18a and 18a" should read --18a and 18b--.

Column 3, line 30, "18a" should be --18b--.

Column 3, line 54, "18a and 18a" should read --18a and 18b--.

Signed and Sealed this

Fourteenth Day of July, 1992

Attest:

DOUGLAS B. COMER

*Attesting Officer*   *Acting Commissioner of Patents and Trademarks*